(12) United States Patent
Wagner

(10) Patent No.: US 8,591,606 B2
(45) Date of Patent: Nov. 26, 2013

(54) BIOFUEL

(76) Inventor: Louis Wagner, Buffalo, NY (US)

( * ) Notice: Subject to any disclaimer, the term of this patent is extended or adjusted under 35 U.S.C. 154(b) by 826 days.

(21) Appl. No.: 12/821,937

(22) Filed: Jun. 23, 2010

(65) Prior Publication Data

US 2010/0330509 A1 Dec. 30, 2010

Related U.S. Application Data

(60) Provisional application No. 61/219,807, filed on Jun. 24, 2009.

(51) Int. Cl.
*C10L 5/40* (2006.01)
*C10L 5/00* (2006.01)

(52) U.S. Cl.
USPC ............... 44/590; 44/589; 44/605; 44/606

(58) Field of Classification Search
USPC ................... 44/589, 590, 605, 606
See application file for complete search history.

(56) References Cited

U.S. PATENT DOCUMENTS

| | | | | |
|---|---|---|---|---|
| 3,830,636 | A | * | 8/1974 | Marsh .............. 44/605 |
| 4,026,678 | A | * | 5/1977 | Livingston ........ 44/589 |
| 4,049,391 | A | * | 9/1977 | Marsh .............. 44/589 |
| 2002/0184816 | A1 | * | 12/2002 | Philipson ......... 44/589 |

* cited by examiner

*Primary Examiner* — Cephia D Toomer
(74) *Attorney, Agent, or Firm* — The Law Office of Michael E. Kondoudis

(57) ABSTRACT

A biofuel that includes a blend of municipal solid waste, selected recyclables, and/or construction and demolition waste including about 40% to 60% wood, about 10% to 20% paper, about 10% to 20% cardboard, about 5% to 10% non-chlorinated plastics, about 5% to 10% rags, about 5% to 10% rugs, and an emission reducing agent, the emission reducing agent being one or more of urea, calcium hydroxide, hydroquinone, anthraquinone, ammonium hydroxide, ammonia, and an ammonium compound.

10 Claims, 1 Drawing Sheet

100

100
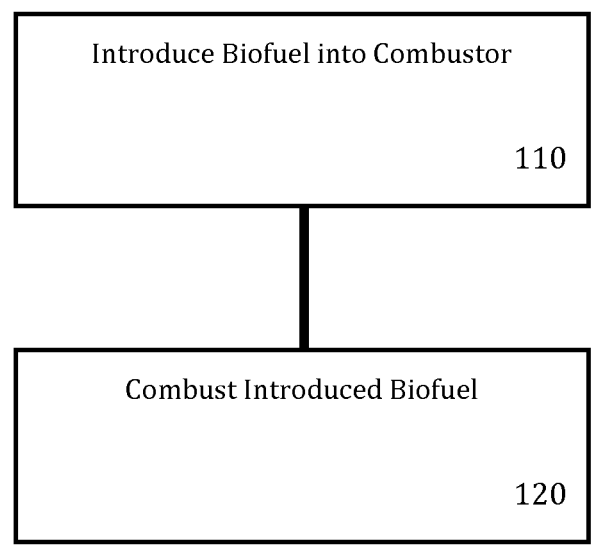

BIOFUEL

CROSS-REFERENCE TO RELATED APPLICATION

This application claims the benefit of U.S. Provisional Patent Application No. 61/219,807, which was filed on Jun. 24, 2009, the disclosure of which is incorporated by reference as if fully set forth herein.

BACKGROUND

1. Technical Field

Embodiments of the present invention relate generally to fuel generation and, more particularly, to an environmentally friendly or "green" biofuel and a method of manufacturing the same.

2. Description of Related Art

A primary consideration of the waste industry is landfill disposal of garbage. Generally, a secondary consideration is the recycling of commodities. Rarely, but increasingly, the waste industry is considering recycling waste as a spec fuel.

It is known to convert biomass to usable forms of energy like methane gas or transportation fuels like ethanol and biodiesel. Biomass is organic material made from plants and animals that contains chemical energy.

It is also known to burn biomass as fuel. When burned, the chemical energy in the biomass is released as heat. This heat can be used to produce steam for making electricity, or to provide heat to industries and homes.

Still further, it is known to burn municipal solid waste (MSW) or garbage, which is also known as the garbage stream, as fuel. For example, in Europe MSW or garbage fuels cement kilns and has other industrial uses. The MSW or garbage burned in these uses, however, is unsorted. This burning can be undesirable because it releases environmentally harmful compounds such as chlorine and sulfur into the atmosphere.

Embodiments of the present invention provide and/or utilize an environmentally friendly biofuel (referred to herein as "Green Fuel") that is derived from the MSW and selected recyclables. Notably, Green Fuel consists only of burnables such as paper, plastic, cardboard, rags, rugs, and/or wood that are picked out of the MSW stream. These burnables are selected from the garbage stream. This selection avoids problems such as chlorine and sulfur and other inorganic materials that result when garbage is burned. Another innovative aspect of the present invention is that materials from the MSW stream that are burnable and have high BTUs may be specifically picked out. A result is a fuel from MSW that, when substituted for coal, yields a reduction of green house gases such as carbon dioxide, sulfur dioxide, and nitrous oxide.

BRIEF SUMMARY

According to one aspect of the present invention, there is provided a composition of matter that includes a blend of: between about 40% to 60% wood; between about 10% to 20% paper; between about 10% to 20% cardboard; between about 5% to 10% non-chlorinated plastics; between about 5% to 10% rags; between about 5% to 10% rugs; and an emission reducing agent, the emission reducing agent being one or more of urea, calcium hydroxide, hydroquinone, anthraquinone, ammonium hydroxide, ammonia, and an ammonium compound. The urea reduces nitrous oxide emissions, the calcium hydroxide reduces carbon dioxide emissions, the hydroquinone reduces sulfur emissions, the anthraquinone reduces sulfur emissions, the ammonium hydroxide reduces carbon dioxide emissions, and the ammonia and ammonium compound reduce carbon dioxide emissions, when the composition is combusted.

Another aspect of the present invention provides a biofuel that includes a blend of municipal solid waste, selected recyclables, and/or construction and demolition waste including about 40% to 60% wood, about 10% to 20% paper, about 10% to 20% cardboard, about 5% to 10% non-chlorinated plastics, about 5% to 10% rags, about 5% to 10% rugs, and an emission reducing agent, the emission reducing agent being one or more of urea, calcium hydroxide, hydroquinone, anthraquinone, ammonium hydroxide, ammonia, and an ammonium compound, the blend being characterized by: a combustion energy of at least about 11,000 BTUs per pound; a particle range of about ⅛th of an inch to about 6 inches; and after combustion, less than 10% ash, a non-detectable levels of sulfur, chlorine, and heavy metals, a non-detectable level of sodium chloride, and a non-detectable level of polychlorinated biphenyls.

Still another aspect of the present invention provides a method of operating a combustor. The method includes introducing a biofuel into a combusting section of the combustor; and causing combustion of the introduced biofuel. The biofuel includes a blend of municipal solid waste, selected recyclables, and/or construction and demolition waste including about 40% to 60% wood, about 10% to 20% paper, about 10% to 20% cardboard, about 5% to 10% non-chlorinated plastics, about 5% to 10% rags, about 5% to 10% rugs, and an emission reducing agent, the emission reducing agent being one or more of urea, calcium hydroxide, hydroquinone, anthraquinone, ammonium hydroxide, ammonia, and an ammonium compound, the blend being characterized by: a combustion energy of at least about 11,000 BTUs per pound; a particle range of about ⅛th of an inch to about 6 inches; and after combustion, less than 10% ash, a non-detectable levels of sulfur, chlorine, and heavy metals, a non-detectable level of sodium chloride, and a non-detectable level of polychlorinated biphenyls.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which FIG. 1. is a flowchart of a method of operating a combustor consistent with an embodiment of the present invention.

DETAILED DESCRIPTION

Reference will now be made in detail to embodiments of the present invention, examples of which are illustrated in the accompanying drawing, wherein like reference numerals refer to the like elements throughout. The embodiments are described below to explain the present invention by referring to the FIGURE.

Production

An aspect of one embodiment of the present invention is to produce Green Fuel that has an equivalent energy content (BTUs) to coal from the MSW (garbage waste stream) and/or selected recyclables. This is accomplished by picking out burnable materials from the garbage stream such as wood, paper, cardboard, plastics, rags, rubber, carpet, and many other items such as yard waste, telephone poles, and railroad ties. The materials may be blended to yield a product that has around 12,000 BTUs per pound and may generate anywhere from 30% to 80% less carbon dioxide than when unsorted garbage is burned or when coal is burned. After blending, the material may be quality controlled and sized to meet the specifications of the cement kilns or end users. The particle size generated may range from 1/8" to 6". The final product may feature quality control specifications that would eliminate any possibility of the fuel containing any undesirable materials such as various heavy metals (chrome, mercury, lead, arsenic, and many others) and, also, adverse gas generating compounds such as sulfur and chlorine.

First the fuel from the MSW or selected recyclables stream is extracted. It comes in various sizes and shapes. Examples of feedstocks for Green Fuel include waste plastic, waste paper, waste cardboard, various types of plastic out throws, wax coated paper, wood, yard waste, dried paper sludge, rags, dried latex paint, non-hazardous paint sludge, non hazardous organic materials, non-infectious medical waste, telephone poles, railroad ties, non-hazardous high-BTU materials. Then, the extracted material is shredded (e.g., by running it through the high torque, low speed shredder). Next, the shredded particles are blended. The specific blend formulae or "recipes" may be selectively varied based on various parameters. Non-limiting examples of these parameters include: energy content; levels of carbon neutral ingredients which will reduce carbon dioxide emissions when burned; non-detectable levels of heavy metals such as mercury and lead; levels of selenium and arsenic; and levels of sulfur and chlorine. Next, an emission reducing agent is added. The inventor has discovered that one or more of the following are particularly advantageous additives for this purpose: urea, calcium hydroxide, hydroquinone, anthraquinone, ammonium hydroxide, ammonia, and an ammonium compound. The urea reduces nitrous oxide emissions, the calcium hydroxide reduces carbon dioxide emissions, the hydroquinone reduces sulfur emissions, the anthraquinone reduces sulfur emissions, the ammonium hydroxide reduces carbon dioxide emissions, and the ammonia and ammonium compound reduce carbon dioxide emissions, when the composition is combusted.

The following Table 1 shows a blend of a biofuel consistent with an embodiment of the present invention that the inventor has determined to be particularly advantageous:

| Ingredient/Feedstock | Amount (%) |
| --- | --- |
| wood | 40%-60% |
| paper | 10%-20% |
| cardboard | 10%-20% |
| non-chlorinated plastics | 5%-10% |
| rags | 5%-10% |
| rugs | 5%-10% |
| emission reducing agent | 1-5% |

After blending, a fuel batch is analyzed for the following:
a) BTUs in the area of 11,000 to 13,000 BTUs per pound;
b) Minimal amount of ash, less than 10% ash;
c) Zero or non-detectable sulfur, chlorine, lead, mercury, or any other heavy metals;
d) Non-detectable sodium chloride or any type of salt; and
e) Non-detectable PCBs.

After the analysis is received, any necessary changes are determined and made to the feedstock and blend. For example, if the analysis indicates a need for an increase in BTU level, more plastics, synthetic rags or rubber from tires might be added. Here, an advantageous batch size is 500 tons and an analysis interval is every 500-ton batch.

Particle size is selectively variable based on myriad factors including, for example, the design of the boiler/combustor in which the Green Fuel will be used. By way of non-limiting examples, a stoker design requires particles between 2" to 4" while some cement kilns feed in the main firebox and require 1" material. The inventor contemplates particle sizes ranging from 1" to 3" and has found that an advantageous shredded particle size is 2" to 3".

A shredding apparatus may be used to generate the Green Fuel. The apparatus may be a low speed, high torque, low noise, ram feed, single-shaft rotary type grinder. Such an apparatus enables precision size reduction of wood waste, plastic scrap, MSW & C&D Waste, tires, medical waste, green waste, cables & wire, pallets, plastic, paper, and carpet.

Advantages of Green Fuel Over Burning Conventional MSW (Garbage) or Coal

Embodiments of the present invention offers numerous advantages over conventional trash fuels, including:
1. Lower cost;
2. A 30% to 80% reduction in greenhouse gases such as carbon dioxide, sulfur dioxide, and nitrous oxide;
3. A 30% to 80% reduction in ash which is usually disposed of at a sanitary landfill. So, a reduction in ash means a reduction in disposal costs; and
4. A reduction in radioactive gases in air emissions such as uranium.

Indeed, in comparison to burning wood biomass, many advantages of the biofuel(s) of embodiments of the present invention may be realized, including of up to 99% of the following: greenhouse gases; carbon dioxide; sulfur dioxide; nitrous oxide; ash content; mercury; lead; uranium; thorium; sulfur trioxide; carbonic acid $H_2CO_2$; arsenic; nickel; beryllium; cadmium; barium; chromium; copper; molybdenum; zinc; selenium; and radium. In addition, there is a reduction in the cost by offering a material with the same BTU's at a lower cost than coal and a reduction in acid rain potential.

Referring now to FIG. 1, there is illustrated a method of operating a combustor 100 consistent with an embodiment of the present invention. The method 100 includes the following operations: introducing a biofuel into a combusting section of the combustor (110); and causing combustion of the introduced biofuel (120). Here, the biofuel is a blend of municipal solid waste, selected recyclables, and/or construction and demolition waste including about 40% to 60% wood, about 10% to 20% paper, about 10% to 20% cardboard, about 5% to 10% non-chlorinated plastics, about 5% to 10% rags, about 5% to 10% rugs, and an emission reducing agent, the emission reducing agent being one or more of urea, calcium hydroxide, hydroquinone, anthraquinone, ammonium hydroxide, ammonia, and an ammonium compound. This blend is characterized by: a combustion energy of at least about 11,000 BTUs per pound; a particle range of about 1/8 th of an inch to about 6 inches; and after combustion, less than 10% ash, non-detectable levels of sulfur, chlorine, and heavy metals, a non-detectable level of sodium chloride, and a non-detectable level of polychlorinated biphenyls.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A composition of matter comprising a blend of:
   between about 40% to 60% wood;
   between about 10% to 20% paper;
   between about 10% to 20% cardboard;
   between about 5% to 10% non-chlorinated plastics;
   between about 5% to 10% rags;
   between about 5% to 10% rugs; and
   an emission reducing agent, the emission reducing agent being one or more of urea, calcium hydroxide, hydroquinone, anthraquinone, ammonium hydroxide, ammonia, and an ammonium compound,
   wherein the urea reduces nitrous oxide emissions, the calcium hydroxide reduces carbon dioxide emissions, the hydroquinone reduces sulfur emissions, the anthraquinone reduces sulfur emissions, the ammonium hydroxide reduces carbon dioxide emissions, and the ammonia and ammonium compound reduce carbon dioxide emissions, when the composition is combusted.

2. The composition of claim 1, wherein the emission reducing agent is between 1% to 5% of the blend.

3. The composition of claim 1, wherein, when combusted, the composition yields less than about 4% ash.

4. The composition of claim 1, wherein an amount of energy in a quantity of the composition is at least equal to an amount of energy of the quantity of coal.

5. The composition of claim 1, wherein the composition has an energy content of at least 11,00 BTUs per pound.

6. The composition of claim 1, wherein a moisture content of the composition is between about 4% to 6%.

7. The composition of claim 1, wherein a pH level of the composition is between about 7 to 8.

8. The composition of claim 1, wherein a sulfer content is less than 100 ppm, a chlorine content is less than 100 ppm, a mercury content is less than 0.2 ppm, a level of cadmium is less than 1 ppm, a level of arsenic is less than 5 ppm, a level of selenium is less than 1 ppm, and a lead content is less than 5 ppm.

9. A biofuel comprising
   a blend of municipal solid waste, selected recyclables, and/or construction and demolition waste including about 40% to 60% wood, about 10% to 20% paper, about 10% to 20% cardboard, about 5% to 10% non-chlorinated plastics, about 5% to 10% rags, about 5% to 10% rugs, and an emission reducing agent, the emission reducing agent being one or more of urea, calcium hydroxide, hydroquinone, anthraquinone, ammonium hydroxide, ammonia, and an ammonium compound, the blend being characterized by:
   a combustion energy of at least about 11,000 BTUs per pound;
   a particle range of about $\frac{1}{8}$th of an inch to about 6 inches; and
   after combustion,
      less than 10% ash,
      non-detectable levels of sulfur, chlorine, and heavy metals,
      a non-detectable level of sodium chloride, and
      a non-detectable level of polychlorinated biphenyls.

10. A method of operating a combustor, comprising:
    introducing a biofuel into a combusting section of the combustor; and
    causing combustion of the introduced biofuel,
    wherein the biofuel comprises a blend of municipal solid waste, selected recyclables, and/or construction and demolition waste including about 40% to 60% wood, about 10% to 20% paper, about 10% to 20% cardboard, about 5% to 10% non-chlorinated plastics, about 5% to 10% rags, about 5% to 10% rugs, and an emission reducing agent, the emission reducing agent being one or more of urea, calcium hydroxide, hydroquinone, anthraquinone, ammonium hydroxide, ammonia, and an ammonium compound, the blend being characterized by:
    a combustion energy of at least about 11,000 BTUs per pound;
    a particle range of about $\frac{1}{8}$ th of an inch to about 6 inches; and
    after combustion,
       less than 10% ash,
       non-detectable levels of sulfur, chlorine, and heavy metals,
       a non-detectable level of sodium chloride, and
       a non-detectable level of polychlorinated biphenyls.

* * * * *